United States Patent
Nishio et al.

(10) Patent No.: US 9,265,041 B2
(45) Date of Patent: *Feb. 16, 2016

(54) INTEGRATED CIRCUIT FOR SETTING SUBBANDS IN MULTICARRIER COMMUNICATION FOR RADIO COMMUNICATION BASE STATION APPARATUS

(71) Applicant: Panasonic Intellectual Property Corporation of America, Torrance, CA (US)

(72) Inventors: Akihiko Nishio, Osaka (JP); Daichi Imamura, Beijing (CN); Masaru Fukuoka, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/687,827

(22) Filed: Apr. 15, 2015

(65) Prior Publication Data

US 2015/0223218 A1 Aug. 6, 2015

Related U.S. Application Data

(63) Continuation of application No. 14/305,973, filed on Jun. 16, 2014, now Pat. No. 9,036,595, which is a (Continued)

(30) Foreign Application Priority Data

Nov. 4, 2005 (JP) .................................. 2005-321110

(51) Int. Cl.
*H04W 72/04* (2009.01)
*H04B 7/12* (2006.01)
(Continued)

(52) U.S. Cl.
CPC .............. *H04W 72/044* (2013.01); *H04B 7/12* (2013.01); *H04J 4/00* (2013.01); *H04L 5/0037* (2013.01);
(Continued)

(58) Field of Classification Search
None
See application file for complete search history.

(56) References Cited

U.S. PATENT DOCUMENTS

| 5,995,147 | A | 11/1999 | Suzuki |
| 6,064,662 | A | 5/2000 | Gitlin et al. |

(Continued)

FOREIGN PATENT DOCUMENTS

| JP | 10-66039 A | 3/1998 |
| JP | 2000-92009 A | 3/2000 |

(Continued)

OTHER PUBLICATIONS

3GPP TSG RAN WG1 Ad Hoc on LTE, "Downlink Channelization and Multiplexing for EUTRA," R1-050604, France, Jun. 2005, pp. 1-9.

(Continued)

*Primary Examiner* — Christine Duong
(74) *Attorney, Agent, or Firm* — Seed IP Law Group PLLC

(57) ABSTRACT

A wireless communication base station apparatus wherein when a frequency scheduling transmission and a frequency diversity transmission are performed in a multicarrier communication at the same time, the adaptive control of a channel for performing the frequency scheduling transmission can be prevented from being complicated. In this apparatus, a modulating part (12) modulates an encoded Dch data to generate Dch data symbols. A modulating part (22) modulates an encoded Lch data to generate Lch data symbols. An assigning part (103) assigns the Dch and Lch data symbols to subcarriers constituting OFDM symbols and outputs them to a multiplexing part (104). At this moment, the assigning part (103) assigns a set of Dch and Lch data symbols to each subcarrier for a respective subband.

20 Claims, 15 Drawing Sheets

Related U.S. Application Data continuation of application No. 13/567,912, filed on Aug. 6, 2012, now Pat. No. 8,787,291, which is a continuation of application No. 12/091,905, filed as application No. PCT/JP2006/322014 on Nov. 2, 2006, now Pat. No. 8,259,658.

(51) Int. Cl.
  *H04W 52/42* (2009.01)
  *H04W 72/12* (2009.01)
  *H04L 5/00* (2006.01)
  *H04J 4/00* (2006.01)
  *H04L 27/26* (2006.01)
  *H04B 7/04* (2006.01)

(52) U.S. Cl.
  CPC ............ *H04L 27/2627* (2013.01); *H04W 52/42* (2013.01); *H04W 72/1205* (2013.01); *H04W 72/1263* (2013.01); *H04B 7/0452* (2013.01); *H04W 72/04* (2013.01)

(56) References Cited

U.S. PATENT DOCUMENTS

| | | | |
|---|---|---|---|
| 6,563,881 | B1 | 5/2003 | Sakoda et al. |
| 7,916,623 | B2 | 3/2011 | Kim et al. |
| 2004/0176094 | A1 | 9/2004 | Kim et al. |
| 2004/0228267 | A1 | 11/2004 | Agrawal et al. |
| 2004/0255220 | A1 | 12/2004 | Sudo |
| 2005/0232135 | A1 | 10/2005 | Mukai et al. |
| 2006/0039318 | A1 | 2/2006 | Oh et al. |
| 2006/0209669 | A1 | 9/2006 | Nishio |
| 2007/0004465 | A1 | 1/2007 | Papasakellariou et al. |
| 2007/0036067 | A1 | 2/2007 | Zhang et al. |
| 2007/0047495 | A1 | 3/2007 | Ji et al. |
| 2007/0086406 | A1 | 4/2007 | Papasakellariou |
| 2008/0089431 | A1 | 4/2008 | Van De Beek et al. |

FOREIGN PATENT DOCUMENTS

| | | |
|---|---|---|
| JP | 2001-119744 A | 4/2001 |
| JP | 2003-264524 A | 9/2003 |
| JP | 2005-294895 A | 10/2005 |
| WO | 03/084108 A1 | 10/2003 |
| WO | 2004/079949 A1 | 9/2004 |
| WO | 2004/102816 A2 | 11/2004 |
| WO | 2005/020488 A1 | 3/2005 |
| WO | 2005/034400 A1 | 4/2005 |

OTHER PUBLICATIONS

"Distributed Resource Allocation for OFDMA," Siemens, 3GPP TSG RAN WG1#43, R1-051418, Seoul, Korea, Nov. 7-11, 2005, 5 pages. (last modified Oct. 31, 2005, see http://www.3gpp.org/ftp/tsg_ran/WG1_RL1/TSGR1_43/Docs/).

"Downlink Resource Allocation," LG Electronics, 3GPP TSG RAN WG1#42, R1-050835, London, United Kingdom, Aug. 29-Sep. 2, 2005, 4 pages.

Huawei, "EUTRA downlink multiplexing of localized and distributed channels," R1-051192, Agenda Item: 8.3, 3GPP TSG RAN WG1, San Diego, USA, Oct. 10-14, 2005, 3 pages.

International Search Report for PCT/JP2006/322014, dated Feb. 6, 2007.

LG Electronics, "Downlink resource allocation for E-UTRA," R1-051049, Agenda Item: 8.3, 3GPP TSG RAN WG1 #42bis, San Diego, USA, Oct. 10-14, 2005, 4 pages.

Li, "Yidong tongxin yuanli yu xitong (Mobile Communication Theory and System)," Westsouth Normal University Press, Mar. 2000, 4 pages. (with partial English Translation).

Mei et al., "Tiaopin tongxin dizhi bianma lilun (Frequency Hopping Communication Address Coding Theory)," National Defence Industry Press, Jan. 1996, 3 pages. (with partial English Translation).

Nortel, "Proposal for the Downlink Sub-Channelization for E-UTRA," Report R1-050895, 3rd Generation Partnership Project (3 GPP™) TSG RAN WG1 Meeting #42, London, Aug. 29-Sep. 2, 2005, pp. 1-6.

Notice of the Grounds for Rejection, mailed Jun. 1, 2010, relating to Japanese Patent Application No. 2007-542816, 4 pages.

Notice of the Reasons for Rejection mailed Feb. 16, 2010, issued in corresponding Japanese Patent Application No. 2007-542816, 4 pages.

Office Action, for Chinese Patent Application No. 200680039368.2, mailed Sep. 9, 2010, 9 pages.

Siemens, "Distributed Resource Allocation for OFDMA," Report R1-051418, 3rd Generation Partnership Project (3 GPP™) TSG RAN WG1 Meeting #43, Seoul, Nov. 7-11, 2005, pp. 1-5.

| MS-ID | CHANNEL CLASSIFICATION | SUBBAND NUMBER | MCS INFORMATION |

FIG.13

INTEGRATED CIRCUIT FOR SETTING SUBBANDS IN MULTICARRIER COMMUNICATION FOR RADIO COMMUNICATION BASE STATION APPARATUS

BACKGROUND

1. Technical Field

The present invention relates to a subband setting method and a radio communication mobile station apparatus in multicarrier communication.

2. Description of the Related Art

In recent years, in radio communication, particularly in mobile communication, various kinds of information such as images and data other than speech have become targets of transmission. Demand for higher-speed transmission is likely to increase in the future, and, to realize high-speed transmission, a radio transmission technique is desired that realizes high transmission efficiency by utilizing limited frequency resources efficiently.

Radio transmission techniques that respond to this demand include OFDM (Orthogonal Frequency Division Multiplexing). OFDM refers to a multicarrier transmission technique for transmitting data in parallel using a large number of subcarriers, and is known as a technique that has high frequency efficiency and characteristics of reducing inter-symbol interference under a multipath environment and that is effective in improving transmission efficiency.

Performing frequency scheduling transmission and frequency diversity transmission when this OFDM is used in downlink and data for a plurality of radio communication mobile station apparatuses (hereinafter simply "mobile stations") is frequency-domain-multiplexed on a plurality of subcarriers, is studied (for example, see Non-Patent Document 1).

With frequency scheduling transmission, a radio communication base station apparatus (hereinafter simply "base station") allocates subcarriers to mobile stations adaptively based on received quality of each frequency band at the mobile stations, so that it is possible to obtain a maximal multi-user diversity effect and perform communication very efficiently. Such frequency scheduling transmission is a scheme suitable for data transmission mainly when the mobile station moves at low speed. On the other hand, frequency scheduling transmission requires feedback of received quality information from the mobile stations and so is not suitable for data transmission when the mobile station moves at high speed. Further, frequency scheduling is generally performed per subband which is obtained by dividing adjacent subcarriers into blocks, and so cannot provide a very high frequency diversity effect.

In Non-Patent Document 1, a channel for performing this frequency scheduling transmission is referred to as a localized channel (hereinafter "Lch"). Conventionally, Lchs are allocated in subband units or in units of a plurality of consecutive subcarriers. Further, generally, adaptive control such as adaptive modulation is performed on Lchs per subband (in the frequency domain) and per subframe (in the time domain). For example, to achieve a required error rate, the base station performs adaptive control on an MCS (Modulation and Coding Scheme) of Lch data symbols based on received quality information fed back from the mobile station.

In addition, Non-Patent Document 1 discloses an example where one frame (10 ms) is divided into 20 subframes (one subframe=0.5 ms) and one subframe includes six or seven OFDM symbols.

By contrast with this, frequency diversity transmission allocates data for the mobile stations to subcarriers in the full band in a distributed manner, and so can provide a high frequency diversity effect. Further, frequency diversity transmission does not require received quality information from the mobile stations, and so is an effective scheme in a state to which frequency scheduling transmission is difficult to apply as described above. On the other hand, frequency diversity transmission is performed regardless of the received quality at the mobile stations, and so cannot provide a multi-user diversity effect as in frequency scheduling transmission. In Non-Patent Document 1, a channel for performing such frequency diversity transmission is referred to as a distributed channel (hereinafter "Dch"). Conventionally, Dchs are set according to FH (Frequency Hopping) patterns which cover the whole band of OFDM symbols.

Non-Patent Document 1: R1-050604 "Downlink Channelization and Multiplexing for EUTRA" 3GPP TSG RAN WG1 Ad Hoc on LTE, Sophia Antipolis, France, 20-21 June, 2005

BRIEF SUMMARY

Problems to be Solved by the Invention

Here, Non-Patent Document 1 sets Dchs according to FH patterns which cover the whole band of OFDM symbols to perform frequency scheduling transmission and frequency diversity transmission at the same time, and so Dch data symbols are allocated to subbands to which Lchs are allocated. As a result, when the number of mobile stations communicating with the base station changes and the number of settings of Dch changes, the resource size of one Lch, that is, the number of bits transmitted in one subband and one subframe using one Lch changes. That is, the coding block size of an Lch varies per subframe.

In this way, if the coding block size of an Lch varies per subframe, the coding gain varies per subframe and the error rate that can be achieved in certain received quality varies per subframe. That is, when Dchs are set according to FH patterns which cover the whole band of OFDM symbols as disclosed in Non-Patent Document 1, the number of settings of Dch changes and, consequently, BER (Bit Error Rate) performances of Lchs change. As described above, adaptive control is generally performed per subframe on Lchs, and so, when the number of settings of Dch changes and the BER performances of Lchs change, the base station needs to change the correspondence relationship between the received quality and the MCS in adaptive modulation per subframe in accordance with the change of the BER performances, which makes adaptive control for Lchs complicated.

Further, when the number of settings of Dch changes and the coding block size of an Lch changes per subframe, the base station needs to report the coding block size every time the coding block size changes, to the mobile station that receives and decodes data symbols of Lchs, which makes design of a communication system complicated.

It is therefore an object of the present invention to provide a subband setting method and a base station that, when frequency scheduling transmission and frequency diversity transmission are performed at the same time in multicarrier communication, prevent adaptive control for a channel for performing frequency scheduling transmission from becoming complicated.

Means for Solving the Problem

The subband setting method of the present invention includes: dividing a plurality of subcarriers forming a multicarrier signal into a plurality of subbands; and setting in the plurality of subbands both first subbands including data for a plurality of radio communication mobile station apparatuses and second subbands including data for only one radio communication mobile station apparatus.

Advantageous Effect of the Invention

According to the present invention, when frequency scheduling transmission and frequency diversity transmission are performed at the same time in multicarrier communication, it is possible to prevent adaptive control for a channel for performing frequency scheduling transmission from becoming complicated.

BRIEF DESCRIPTION OF THE SEVERAL VIEWS OF THE DRAWINGS

FIG. 13 shows a control information format according to Embodiment 2 of the present invention;

DETAILED DESCRIPTION

Embodiments of the present invention will be described in detail below with reference to the accompanying drawings.

Embodiment 1

Figure 1:
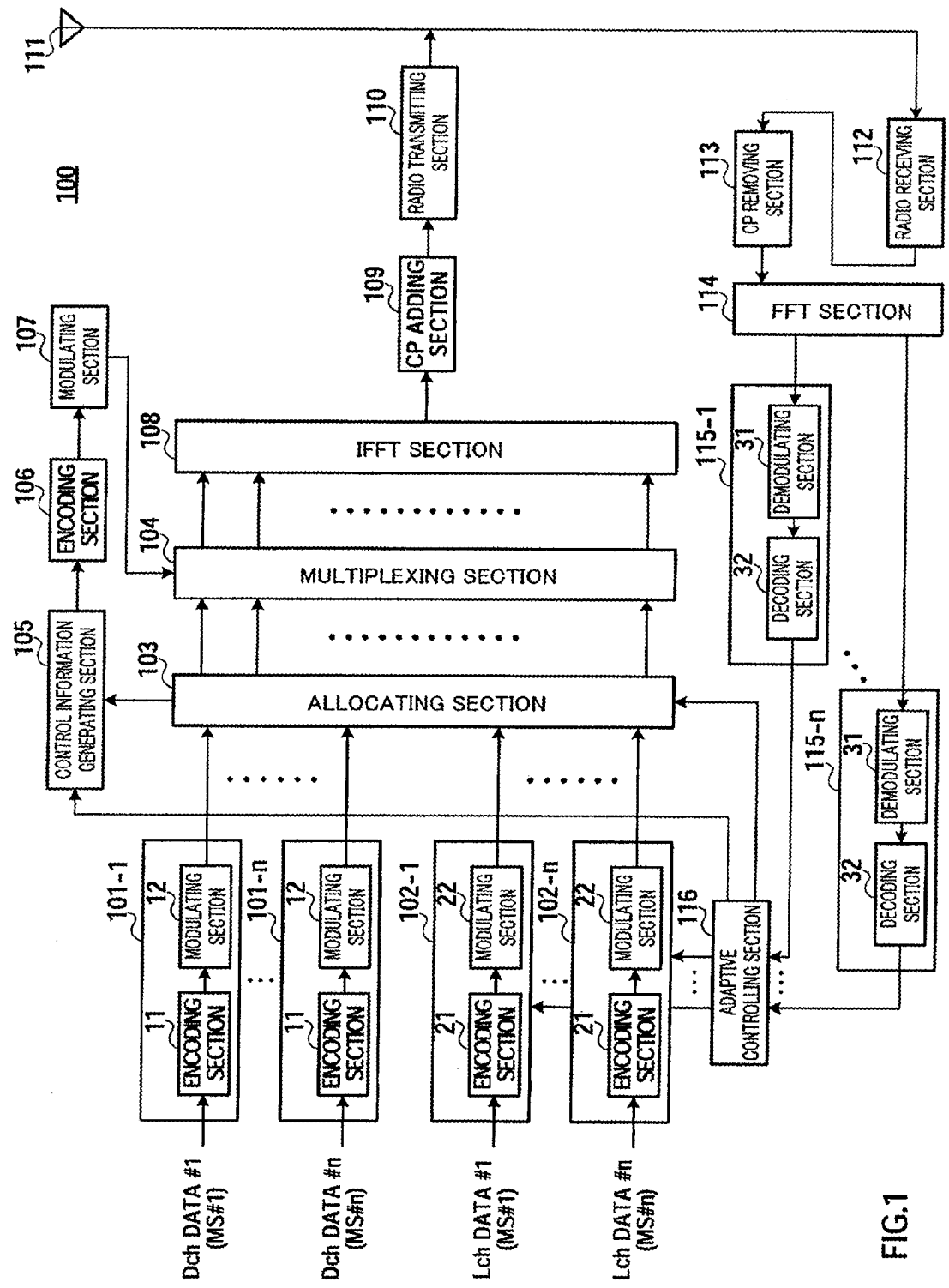
FIG. 1 is a block diagram showing a configuration of a base station according to Embodiment 1 of the present invention.

FIG. 1 shows a configuration of base station 100 according to this embodiment. Base station 100 divides a plurality of subcarriers that form an OFDM symbol, which is a multicarrier signal, into a plurality of subbands, and sets a Dch or an Lch per subband in these plurality of subbands.

Base station 100 includes the same number of encoding and modulating sections 101-1 to 101-$n$ which are configured with encoding sections 11 and modulating sections 12 for Dch data, encoding and modulating sections 102-1 to 102-$n$ which are configured with encoding sections 21 and modulating sections 22 for Lch data, and demodulating and decoding sections 115-1 to 115-$n$ which are configured with demodulating sections 31 and decoding sections 32, as mobile stations (MSs) n that base station 100 can communicate with.

In encoding and modulating sections 101-1 to 101-$n$, encoding sections 11 perform encoding processing such as turbo encoding on Dch data #1 to #n for each of mobile stations #1 to #n, and modulating sections 12 perform modulating processing on the encoded Dch data to generate Dch data symbols.

In encoding and modulating sections 102-1 to 102-$n$, encoding sections 21 perform encoding processing such as turbo encoding on Lch data #1 to #n for each of mobile stations #1 to #n, and modulating sections 22 perform modulating processing on the encoded Lch data to generate Lch data symbols. In this case, the coding rate and the modulation scheme follow MCS information inputted from adaptive controlling section 116.

Allocating section 103 allocates Dch data symbols and Lch data symbols to subcarriers that form OFDM symbols according to control from adaptive controlling section 116, and outputs the results to multiplexing section 104. At this time, allocating section 103 allocates Dch data symbols and Lch data symbols to subcarriers, respectively, per subband. That is, allocating section 103 allocates the Dch data symbols to Dch subbands and allocates the Lch data symbols to Lch subbands. Further, allocating section 103 outputs Dch data symbol allocating information (i.e., information showing the Dch data symbol for which mobile station is allocated to which subcarrier) and Lch data symbol allocating information (i.e., information showing the Lch data symbol for which mobile station is allocated to which subcarrier), to control information generating section 105.

Control information generating section 105 generates control information comprised of Dch data symbol allocating information, Lch data symbol allocating information, and MCS information inputted from adaptive controlling section 116, and outputs the control information to encoding section 106.

Encoding section 106 performs encoding processing on the control information, and modulating section 107 performs modulating processing on the encoded control information and outputs the result to multiplexing section 104.

Multiplexing section 104 multiplexes the control information on the data symbols inputted from allocating section 103 and outputs the results to IFFT (Inverse Fast Fourier Transform) section 108. The control information is multiplexed, for example, per subframe. Further, in this embodiment, the control information may be either time-domain-multiplexed or frequency-domain-multiplexed.

IFFT section 108 performs an IFFT on a plurality of subcarriers to which control information and data symbols are allocated, and generates OFDM symbols, which are multicarrier signals.

CP (Cyclic Prefix) adding section 109 adds the same signal as the tail of each OFDM symbol, to the head of that OFDM symbol as a CP.

Radio transmitting section 110 performs transmitting processing such as D/A conversion, amplification and up-conversion on the OFDM symbols to which CPs are added, and transmits the results to the mobile stations from antenna 111.

On the other hand, radio receiving section 112 receives n OFDM symbols transmitted at the same time from a maximum of n mobile stations, through antenna 111, and performs receiving processing such as down-conversion and D/A conversion on these OFDM symbols.

CP removing section 113 removes the CPs from the OFDM symbols subjected to the receiving processing.

FFT (Fast Fourier Transform) section 114 performs an FFT on the OFDM symbols from which the CPs are removed, and obtains signals of each mobile station, which are multiplexed in the frequency domain. The mobile stations transmit signals using subcarriers or subbands which are different between the mobile stations, and the signals of the mobile stations include received quality information of each subband reported from the mobile stations. The mobile stations can measure received quality of each subband using the received SNR, received SIR, received CINR, received power, interference power, bit error rate, throughput, MCS that achieves a predetermined error rate, and so on. Further, the received quality information may be referred to as "CQI (Channel Quality Indicator)," "CSI (Channel State Information)," and so on.

In demodulating and decoding sections 115-1 to 115-$n$, demodulating sections 31 perform demodulating processing on the signals subjected to the FFT, and decoding sections 32 perform decoding processing on the demodulated signals. By this means, the received data is obtained. Out of the received data, received quality information of each subband is inputted to adaptive controlling section 116.

Adaptive controlling section 116 performs adaptive control on the Lch data based on the received quality information of each subband reported from the mobile stations. That is, adaptive controlling section 116 selects an MCS that achieves a required error rate per subband and outputs MCS information based on the received quality information of each subband, for encoding and modulating sections 102-1 to 102-$n$, and performs frequency scheduling of determining to which subcarriers Lch data #1 to #n are allocated, in subband units using a scheduling algorithm such as the Max SIR method and the proportional fairness method, for allocating section 103. Further, adaptive controlling section 116 outputs the MCS information of each subband to control information generating section 105.

Figure 2:
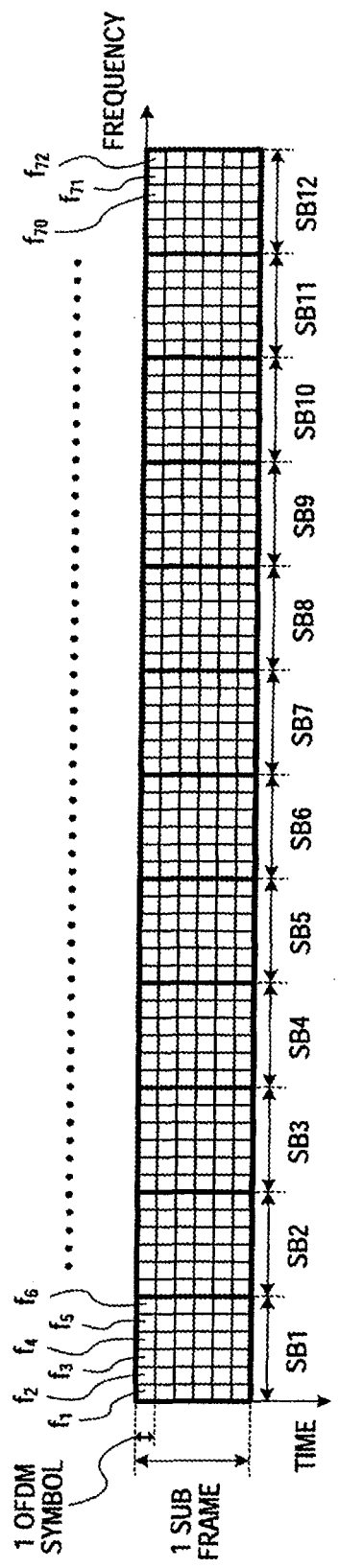
FIG. 2 shows an example of subband division according to Embodiment 1 of the present invention.

Next, the subband setting example according to this embodiment will be described. As shown in FIG. 2, a case will he described below as an example where one OFDM symbol is formed with subcarriers $f_1$ to $f_{72}$, and these subcarriers are equally divided into subbands (SB) 1 to 12. Therefore, one subband includes six subcarriers. Further, one subframe includes six OFDM symbols. Furthermore, although a case will be described where setting of subbands as described below is made in allocating section 103 in advance, the present invention is not limited to this and setting of subbands may change per sub frame.

<Subband Setting Example 1 (FIG. 3)>

Figure 3:
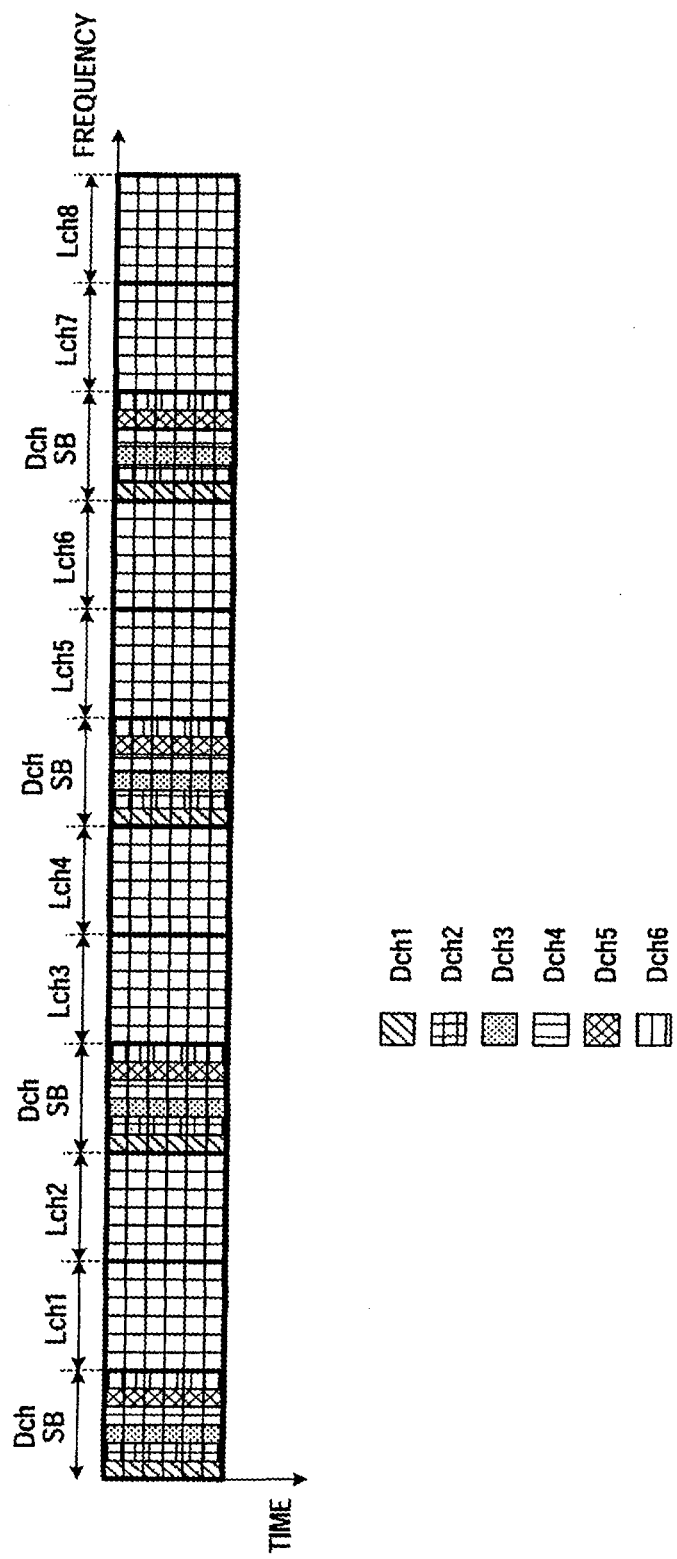
FIG. 3 shows a subband setting example according to Embodiment 1 of the present invention (setting example 1)

In this setting example, as shown in FIG. 3, subbands 1, 4, 7 and 10 are set as Dch subbands, and subbands 2, 3, 5, 6, 8, 9, 11 and 12 are set as Lch subbands. That is, in subbands 1 to 12, Dch subbands (subbands that accommodate only Dch) are set at fixed intervals and arranged periodically.

Here, frequency scheduling is performed in subband units for an Lch, and so each Lch subband includes an Lch data symbol for only one mobile station. That is, one subband forms one Lch for one mobile station. In the example shown in FIG. 3, eight Lchs of Lchs 1 to 8 are set.

On the other hand, frequency diversity transmission needs to be performed on the Dchs, and so subbands 1, 4, 7 and 10 include Dch data symbols for a plurality of mobile stations. In the example shown in FIG. 3, each Dch subband includes Dch data symbols for six mobile stations. That is, in each Dch subband, a plurality of Dchs for a plurality of mobile stations are frequency-domain-multiplexed. Therefore, in the example shown in FIG. 3, four Dch subbands each form Dchs 1 to 6 for six mobile stations.

In this setting example, eight Lchs and six Dchs are frequency-domain-multiplexed in this way.

In this way, in this embodiment, Dchs are not set according to FH patterns that cover the whole band $f_1$ to $f_{72}$ of the OFDM symbols, but are set in subband units instead, and so Dch data symbols are not allocated to the Lch subbands. Therefore, even if the number of mobile stations that communicate with base station 100 changes and the number of settings of Dch changes, the coding block size of each Lch is maintained fixed at "one subband x one subframe." Consequently, according to this embodiment, when frequency scheduling transmission in Lchs and frequency diversity transmission in Dchs are performed at the same time, it is possible to prevent adaptive control for Lchs from becoming complicated. Further, even if the number of settings of Dch changes, the coding block size of each Lch is maintained fixed at "one subband x one subframe," and so it is not necessary to report the coding block size to the mobile stations and facilitate design of a communication system.

<Subband Setting Example 2 (FIG. 4)>

Figure 4:
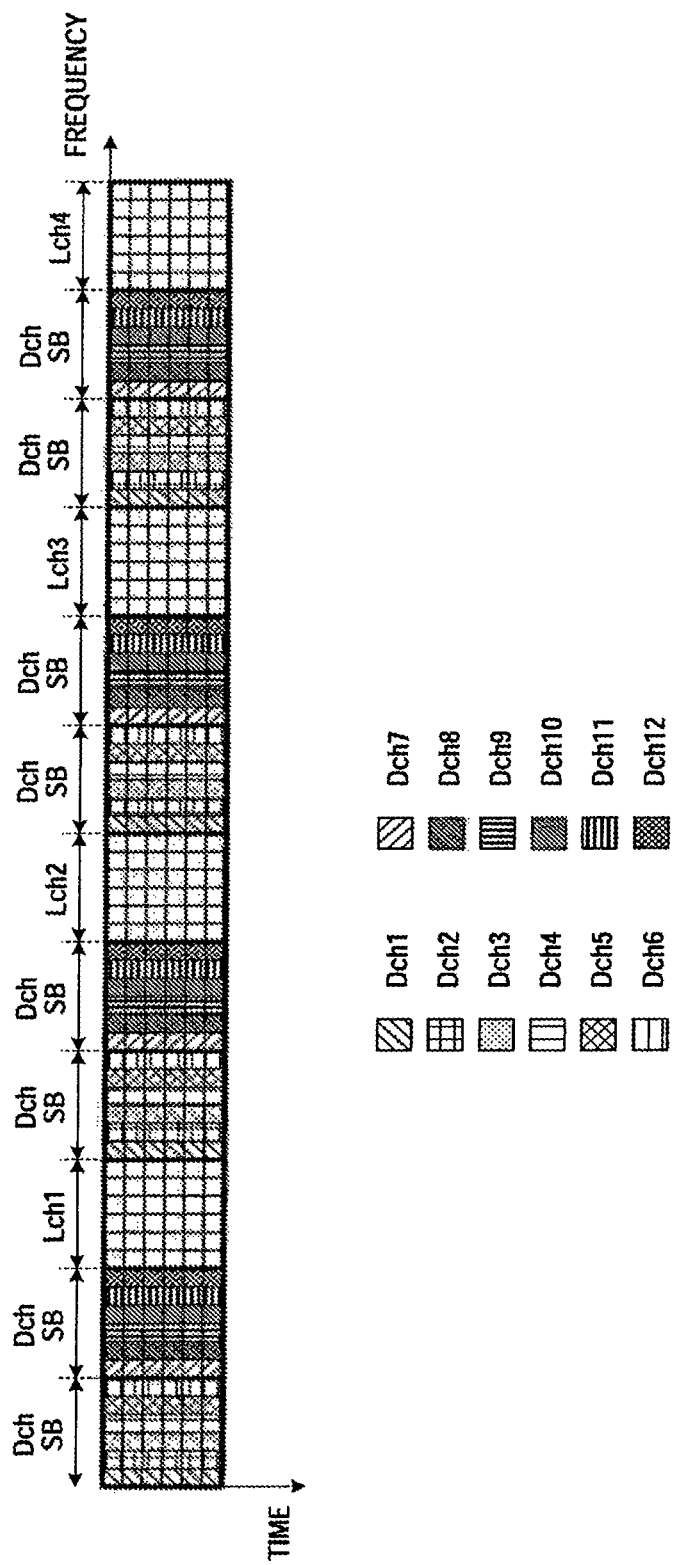
FIG. 4 shows a subband setting example according to Embodiment 1 of the present invention (setting example 2)

Frequency scheduling transmission is not suitable for a mobile station that moves at high speed as described above, and so base station 100 transmits data to the mobile station that moves at high speed using Dchs out of Lchs and Dchs. In this setting example, the number of settings of Dch is changed per cell according to the number of mobile stations that move at high speed (mobile stations whose moving speed exceeds a threshold). That is, as shown in FIG. 4, when the number of mobile stations that move at high speed increases, the number of settings of Dch is increased. In FIG. 3, eight Lchs and six Dchs are frequency-domain-multiplexed, while, in FIG. 4, by setting subbands 1, 2, 4, 5, 7, 8, 10 and 11 as Dch subbands, and setting subbands 3, 6, 9 and 12 as Lch subbands, four Lchs and twelve Dchs are frequency-domain-multiplexed. By this means, when the number of mobile stations that move at high speed increases, the number of mobile stations to which base station 100 can transmit data using Dchs, can be increased.

<Subband Setting Example 3 (FIGS. 5 and 6)>

Figure 5:
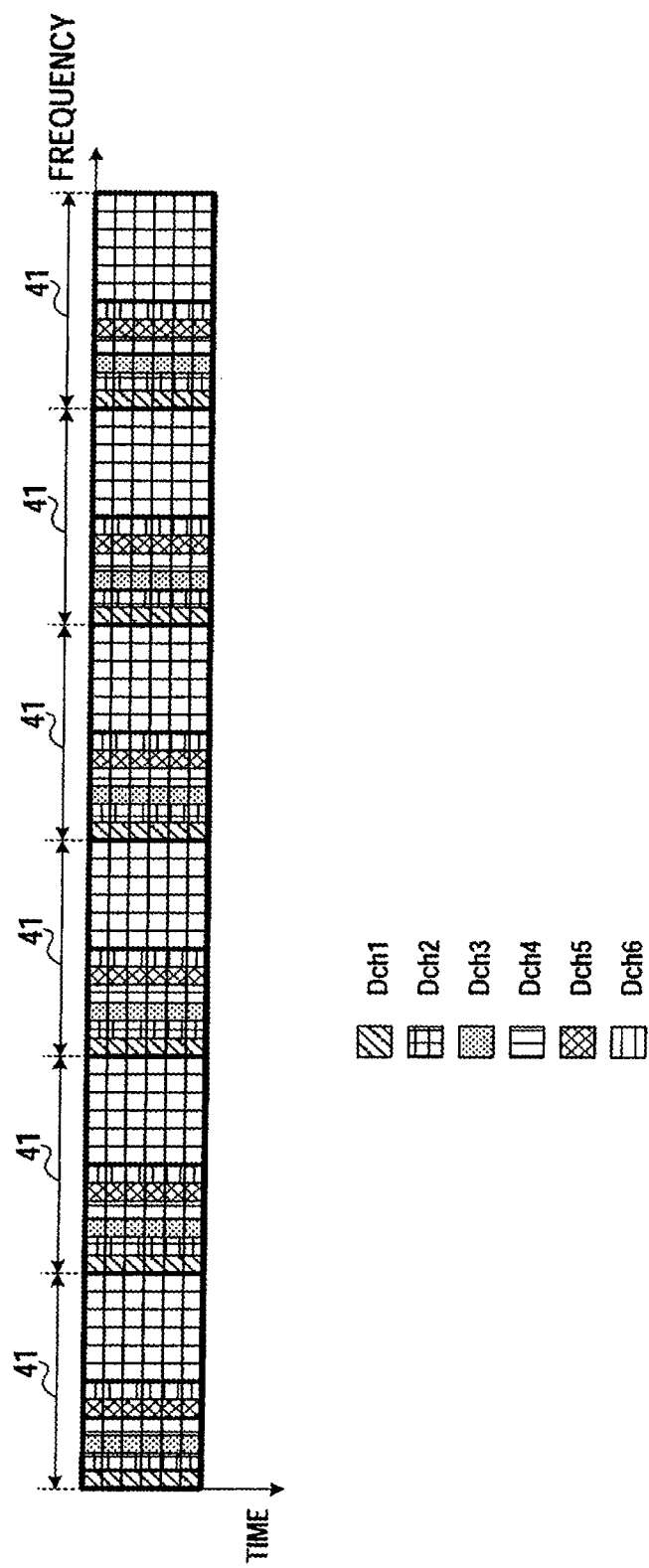
FIG. 5 shows a subband setting example according to Embodiment 1 of the present invention (setting example 3)
Figure 6:
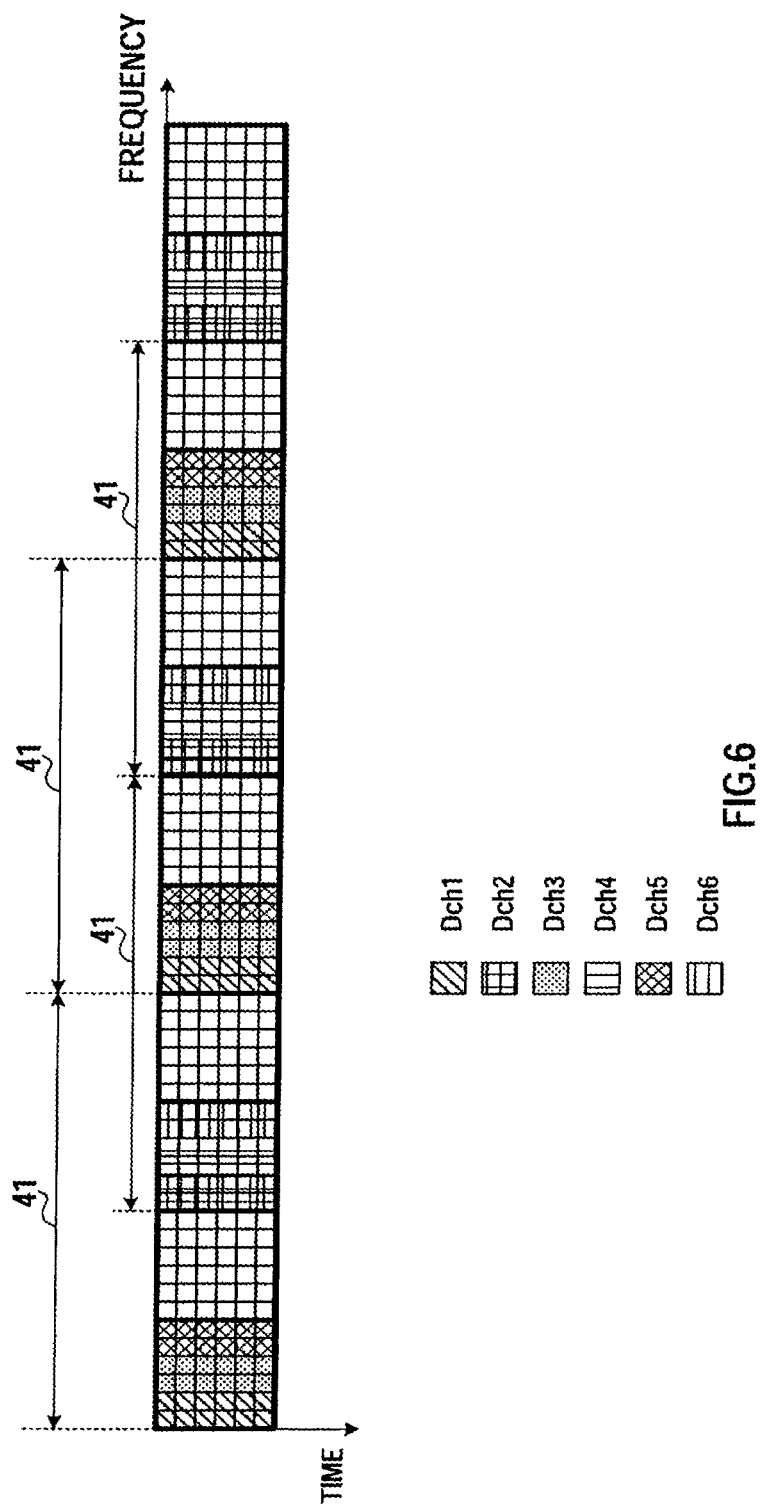
FIG. 6 shows a subband setting example according to Embodiment 1 of the present invention (setting example 3)

In a plurality of subbands 1 to 12 in one OFDM symbol, when interval 41 between a plurality of Dch subbands that include Dch data symbols to the same mobile station, becomes smaller, the number of Dch subbands forming one Dch increases, and so a frequency diversity effect becomes high. Therefore, in this setting example, in a channel environment where delay dispersion in a channel is large, as in a macro cell (that is, fading fluctuation in the frequency domain in the channel is fast and the coherent bandwidth of the channel is narrow), to obtain a high frequency diversity effect, interval 41 is set small as shown in FIG. 5. In a channel environment where delay dispersion in a channel is small, as in a micro cell, (that is, fading fluctuation in the frequency domain in the channel is slow and the coherent bandwidth of the channel is wide), the frequency diversity effect is less likely to be obtained, and so interval 41 is set large as shown in FIG. 6. That is, in this setting example, when delay dispersion in the channel becomes larger, the interval of setting a plurality of Dch subbands that include Dch data symbols for the same mobile station, is made smaller.

Further, the data amount of Dch data transmitted to the mobile stations using one OFDM symbol is made fixed regardless of the size of set interval 41. Therefore, when interval 41 is set small as shown in FIG. 5, the number of subcarriers allocated to one mobile station in each Dch subband is reduced and the number of mobile stations for which frequency multiplexing is performed is increased. When interval 41 is set large as shown in FIG. 6, the number of subcarriers allocated to one mobile station in each Dch subband is increased and the number of mobile stations for which frequency multiplexing is performed is reduced. To be more specific, the number of mobile stations for which frequency multiplexing is performed in each Dch subband is six in the case of FIG. 5, while three in the case of FIG. 6. That is, in this setting example, when delay dispersion in the channel becomes larger, interval 41 is made smaller and the number of mobile stations for which frequency multiplexing is performed in each Dch subband is increased.

In this way, in this setting example, when delay dispersion in the channel is small, as shown in FIG. 6, interval 41 is made large, and the number of mobile stations for which frequency multiplexing is performed in each Dch subband is reduced. Therefore, according to this setting example, when delay dispersion in the channel is small (in the case of FIG. 6), the number of Dchs can be increased or decreased in smaller units than the case where delay dispersion in the channel is large (in the case of FIG. 5). To be more specific, in the case of FIG. 5, Dchs need to be increased or decreased by six channels, while, in the case of FIG. 6, Dchs can be increased or decreased by three channels. In this way, according to this setting example, when delay dispersion in the channel is small, the ratio between the number of Lchs and the number of Dchs can be set more flexibly than the case where delay dispersion in the channel is large.

<Subband Setting Example 4 (FIG. 7)>

Figure 7:
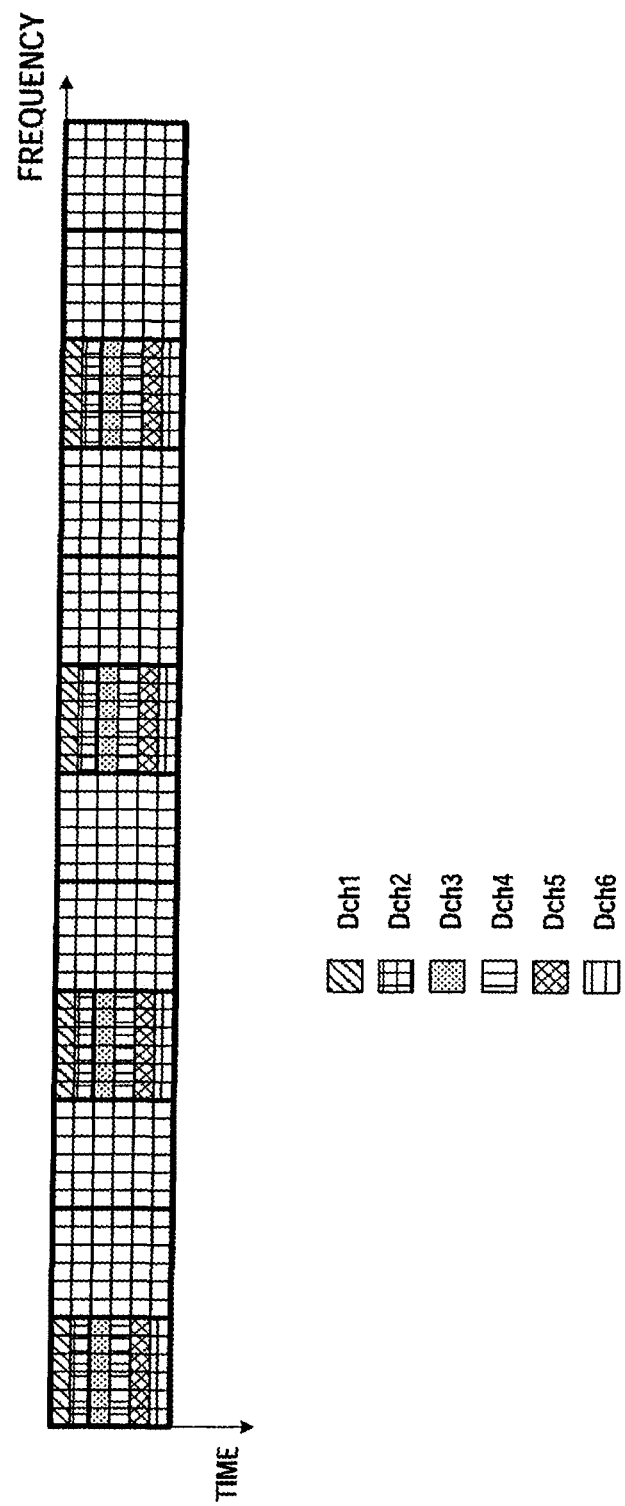
FIG. 7 shows a subband setting example according to Embodiment 1 of the present invention (setting example 4)

Although, in setting examples 1 to 3, a plurality of Dchs are frequency-domain-multiplexed in each Dch subband, in this setting example, as shown in FIG. 7, a plurality of Dchs are time-domain-multiplexed in each Dch subband. That is, in this setting example, time multiplexing is performed for a plurality of mobile stations in Dch subbands. By this means, it is possible to obtain a frequency diversity effect in the Dchs. Further, the mobile station needs to perform receiving processing such as an FFT only in period allocated to the mobile station, so that it is possible to reduce power consumption of the mobile station. Furthermore, base station 100 transmits Dch data symbol allocating information earlier than other control information such as MCS information or performs simple encoding on Dch data symbol allocating information to allow the mobile station to know earlier the period for which Dchs for the mobile station are allocated, and stop receiving processing earlier, so that it is possible to further reduce power consumption of the mobile station.

<Subband Setting Example 5 (FIG. 8)>

Figure 8:
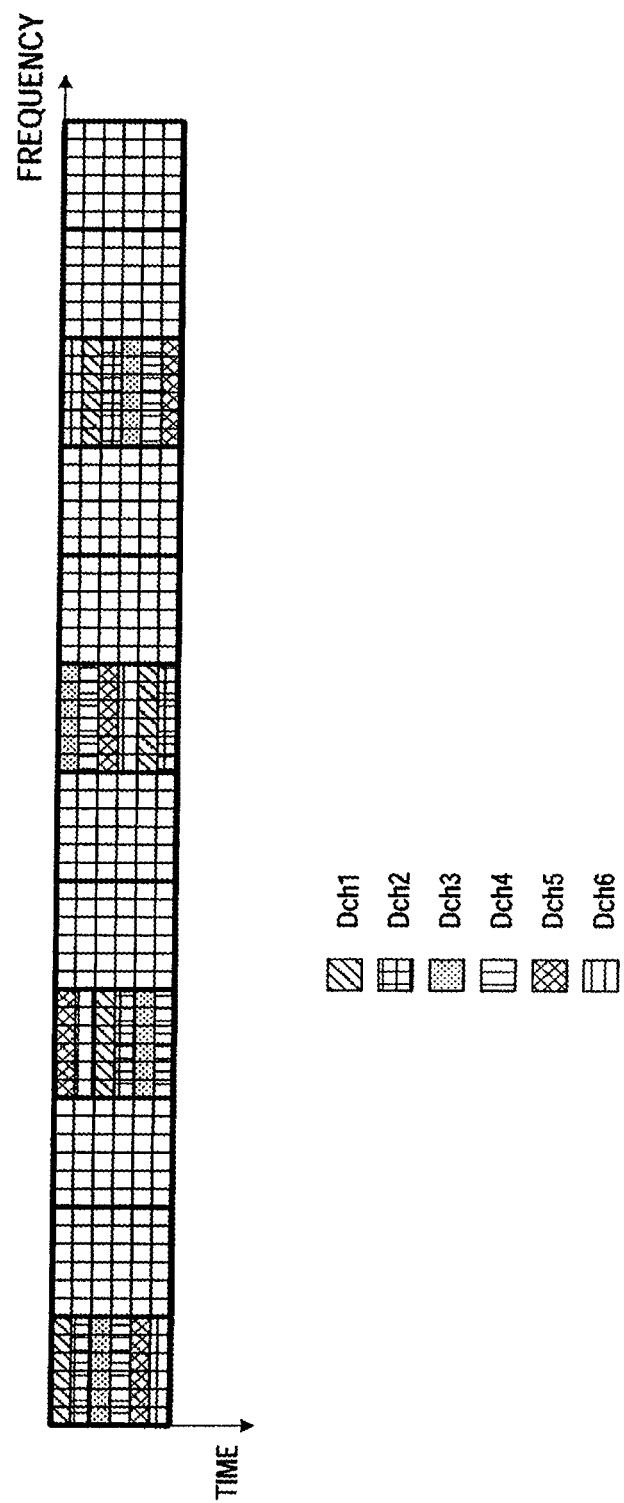
FIG. 8 shows a subband setting example according to Embodiment 1 of the present invention (setting example 5)

In this setting example, in addition to setting example 4 (FIG. 7), as further shown in FIG. 8, positions where Dchs are time-domain-multiplexed are made different in a plurality of Dch subbands. That is, in this setting example, in the plurality of Dch subbands, positions where the plurality of mobile stations for which time multiplexing is performed, are made different. By this means, for the Dchs, it is possible to obtain a diversity effect not only in the frequency domain but also in the time domain. Furthermore, when pilot signals are arranged before and after each subframe, there are parts that are close to the pilot signals and have good channel estimation accuracy and parts that are far from the pilot signals and have poor channel estimation accuracy in each subband, and so, by making positions where Dchs are time-domain-multiplexed different in the plurality of Dch subbands as in this setting example, it is possible to equalize channel estimation accuracy of Dchs.

<Subband Setting Example 6 (FIG. 9)>

Figure 9:
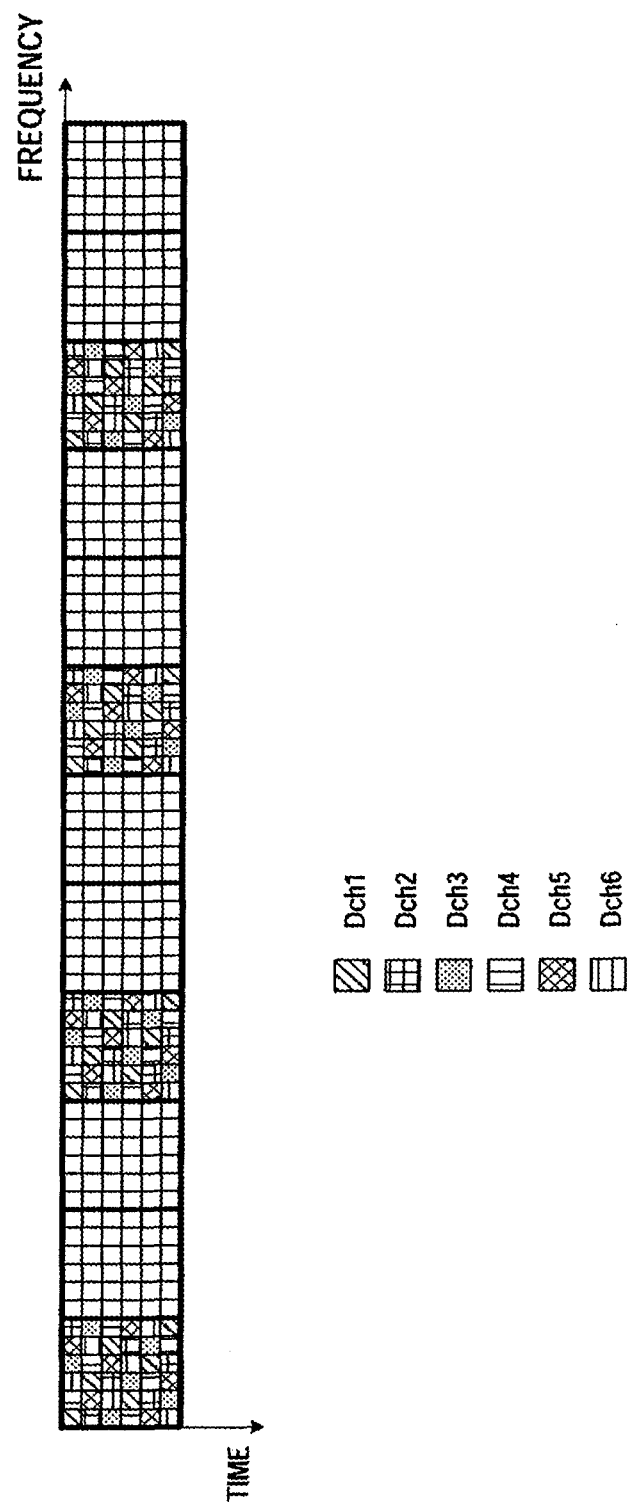
FIG. 9 shows a subband setting example according to Embodiment 1 of the present invention (setting example 6)

In this setting example, as shown in FIG. 9, Dch data symbols for the mobile stations are frequency-hopped in each Dch subband. By this means, it is possible to obtain a diversity effect against fluctuation in the time domain and the frequency domain in the Dch subbands.

<Subband Setting Example 7 (FIG. 10)>

Figure 10:
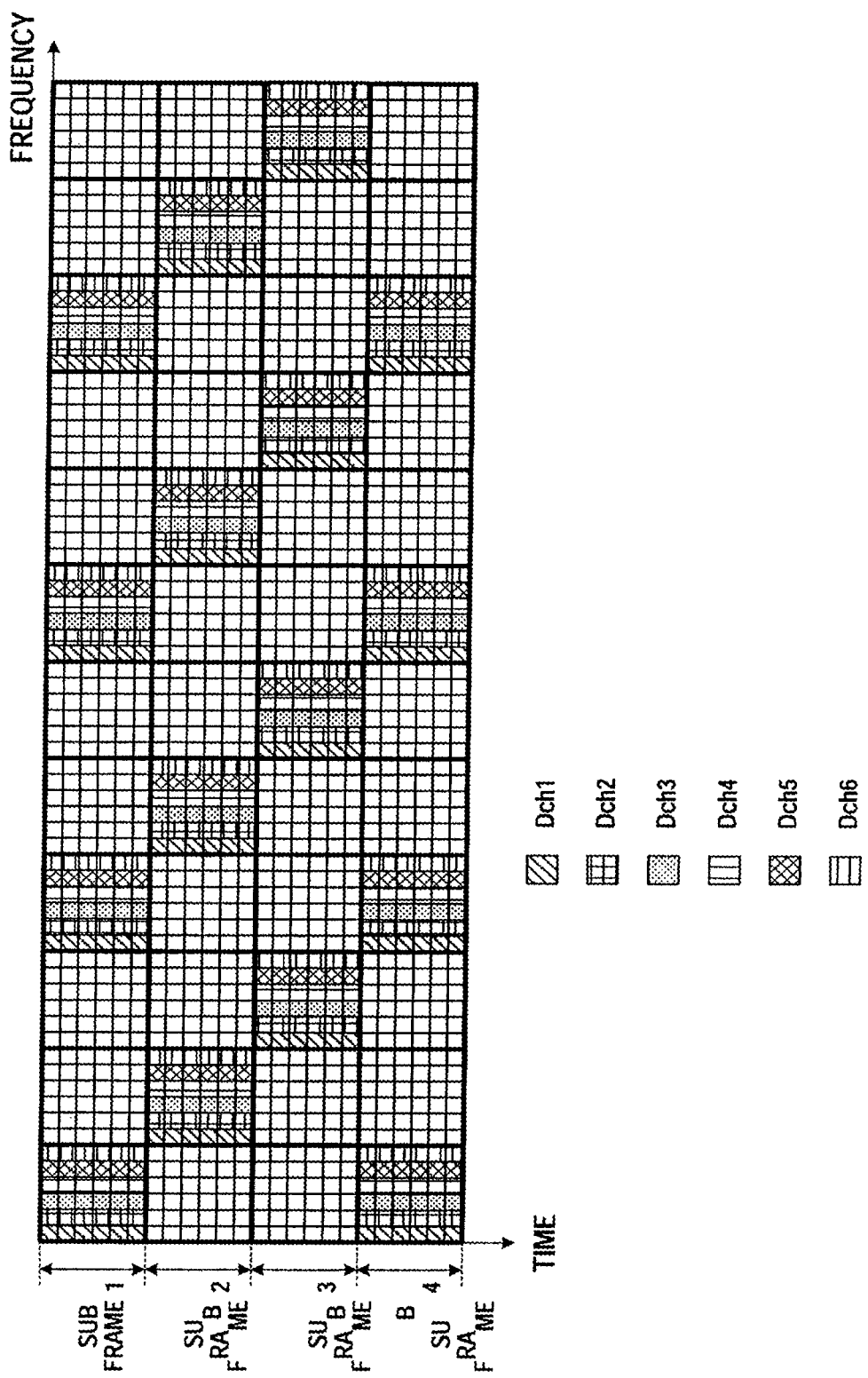
FIG. 10 shows a subband setting example according to Embodiment 1 of the present invention (setting example 7)

In this setting example, as shown in FIG. 10, positions where Dch subbands are set in subbands 1 to 12 are changed per subframe. By this means, it is possible to further improve a frequency diversity effect for Dchs. Further, according to this setting example, subbands having high received quality at the mobile station are not used continuously as Dchs. That is, subbands having low received quality at the mobile station are not used continuously as Lchs, so that it is possible to improve throughput of Lchs.

Subband setting examples 1 to 7 according to this embodiment have been described.

In this way, according to this embodiment, when frequency scheduling transmission for Lchs and frequency diversity transmission for Dchs are performed at the same time, the Dchs and Lchs are set per subband, so that it is possible to prevent adaptive control for the Lchs from becoming complicated. Further, if the number of settings of Dch changes, the coding block size of each Lch is maintained fixed at "one subband x one subframe," and so it is not necessary to report the coding block size to the mobile stations. Further, Dch subbands are set at fixed intervals and arranged periodically, and so it is not necessary to report position information of the Dch subbands to the mobile stations. Therefore, according to this embodiment, design of a communication system becomes simple.

In addition, intervals between Dch subbands do not necessarily have to be fixed, and if the intervals are set in advance, the above-described effects can be obtained.

Further, in the above description, although allocation information for Dch data symbols and allocation information for Lch data symbols are inputted from allocating section 103 to control information generating section 105, these allocation information may be directly inputted from adaptive controlling section 116 to control information generating section 105. In this case, MCS information, allocation information for Dch data symbols and allocation information for Lch data symbols are inputted from allocating section 103 to control information generating section 105.

Embodiment 2

The base station according to this embodiment differs from Embodiment 1 in that Dch subbands are made different per mobile station according to the level of delay dispersion in a channel of each mobile station.

Figure 11:
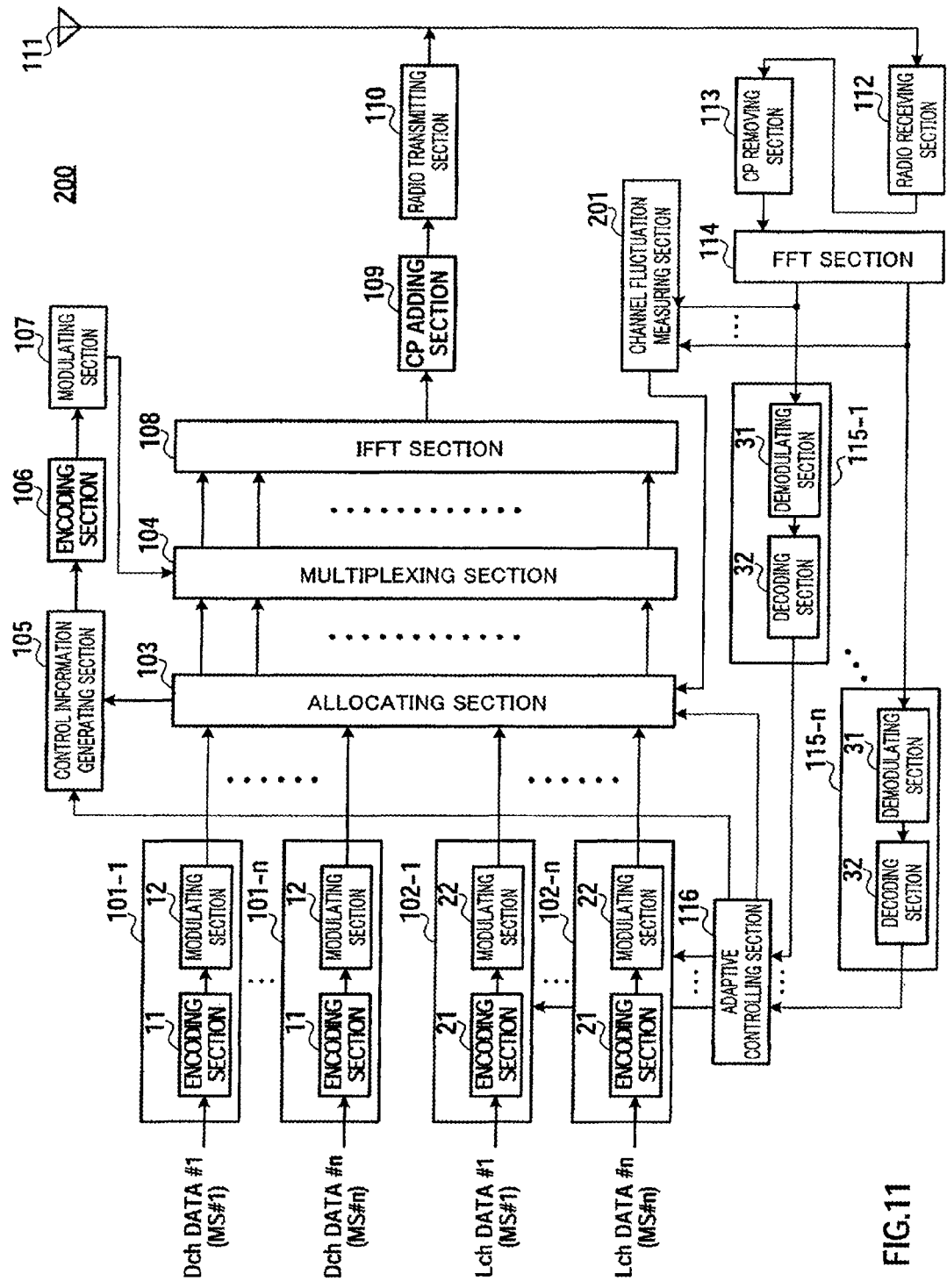
FIG. 11 is a block diagram showing a configuration of a base station according to Embodiment 2 of the present invention.

The configuration of base station 200 according to this embodiment is shown in FIG. 11. In FIG. 11, components that are the same as those in Embodiment 1 (FIG. 1) will be assigned the same reference numerals without further explanations.

In base station 200, channel fluctuation measuring section 201 receives the signal of each mobile station, obtained by FFT section 114. Channel fluctuation measuring section 201 measures the level of channel fluctuation in the frequency domain per mobile station, that is, measures the level of delay dispersion in the channel of each mobile station, using the pilot signal included in the signal of each mobile station, and outputs the result to allocating section 103.

Allocating section 103 allocates Dch data symbols for the mobile stations, to Dch subbands according to the level of delay dispersion in the channel of each mobile station as described below.

Figure 12:
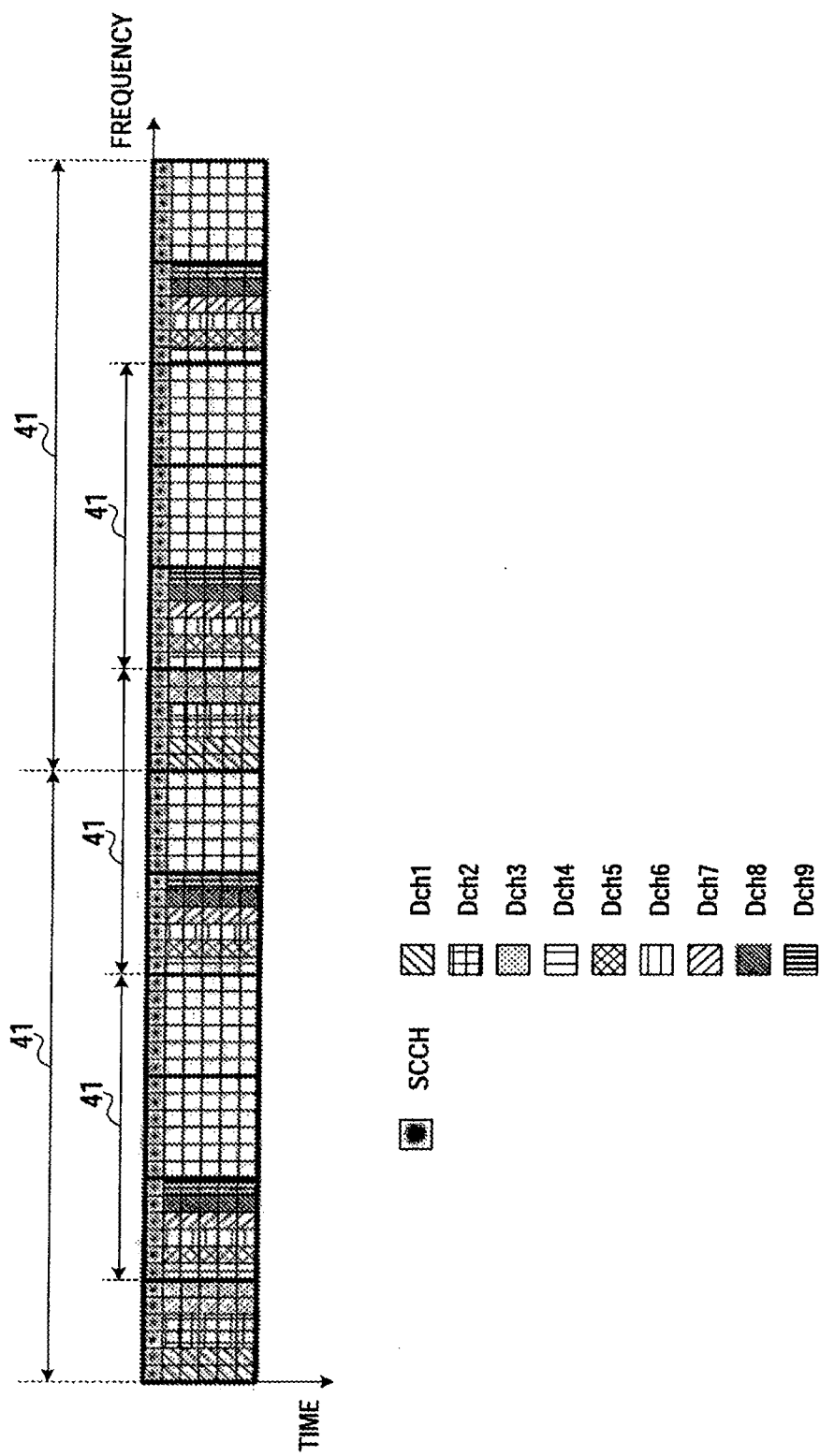
FIG. 12 shows a subband setting example according to Embodiment 2 of the present invention.

That is, in this embodiment, as shown in FIG. 12, Dch subbands are classified into subbands having large setting interval 41 and subbands having small setting interval 41. That is, in one OFDM symbol, both Dch subbands having large setting interval 41 and Dch subbands having small setting interval 41 are set.

In addition, this setting interval 41 is the same as setting interval 41 in subband setting example 3 of Embodiment 1. Further, as in subband setting example 3, in this embodiment, the data amount of Dch data transmitted to the mobile stations using one OFDM symbol is made fixed regardless of the size of setting interval 41. Therefore, as shown in FIG. 12, in Dch subbands having small setting interval 41, the number of Dch subbands is large, and so the number of subcarriers allocated for one mobile station is reduced and the number of mobile stations for which frequency multiplexing is performed is increased, and, in Dch subbands having large setting interval 41, the number of Dch subbands is small, and so the number of subcarriers allocated for one mobile station is increased and the number of mobile stations for which frequency multiplexing is performed is reduced.

In subbands 1 to 12, allocating section 103 allocates Dch data symbols for the mobile station having small delay dispersion in a channel, to Dch subbands (subbands 1 and 7) which have large setting interval 41, and allocates Dch data symbols for the mobile station having large delay dispersion in a channel, to Dch subbands (subbands 2, 5, 8 and 11) which have small setting interval 41. In addition, allocating section 103 judges whether delay dispersion in the channel is small or large per mobile station by comparing the value of delay dispersion in the channel for each mobile station with a threshold.

In this way, this embodiment sets a plurality of Dch subbands, which are suitable for channel environments of the mobile stations, respectively, in one OFDM symbol, so that it is possible to obtain a required and sufficient frequency diversity effect per mobile station.

Next, the format of control information according to this embodiment will be described. Control information generating section 105 in base station 200 generates control information according to the format shown in FIG. 13. In the format shown in FIG. 13, ID of the mobile station, which is a transmission destination of data symbols, is set in "MS-ID," classification information showing either Dch or Lch is set in "channel classification," the Dch subband number or the Lch subband number is set in "subband number," and MCS information for each subband is set in "MCS information." In addition, in "channel classification," the intervals between Dch subbands may be set in addition to the above-described classification information. For example, control information generating section 105 may select and set one of "Lch," "Dch having intervals of two subbands," "Dch having intervals of three subbands" and "Dch having intervals of six subbands" in "channel classification."

The control information generated in this way is time-domain-multiplexed on the head of the subframe by multiplexing section 104 as shown in FIG. 12, and transmitted to all mobile stations as SCCH (Shared Control Channel) control data. That is, in this embodiment, the setting results of Dch subbands and Lch subbands in subbands 1 to 12 are reported to the mobile stations using one control information that has a format common to all mobile stations.

In this way, in this embodiment, the setting results of Dch subbands and Lch subbands are reported to the mobile stations at the same time using control information having a format common to all mobile stations, so that, even if the numbers of Dchs and Lchs change per subframe, control information can be transmitted without wasting resources for data symbol transmission use. Further, one control information format, which is common to Dchs and Lchs, is used, so that design of a communication system becomes simple.

In this embodiment, although the level of channel fluctuation of each mobile station is measured at base station 200, the level of channel fluctuation may be measured at each mobile station and the measured result may be reported to base station 200.

Further, it is also possible to use the control information format shown in FIG. 13 in Embodiment 1. In this case, classification information showing either a Dch or an Lch, is set in "channel classification."

Embodiment 3

The base station according to this embodiment is different from that in Embodiment 1 in that the base station performs transmission power control per subband.

Techniques for reducing interference between cells include a technique called "interference coordination." With interference coordination, the base station of each cell coordinates in allocating resources and coordinates in performing transmission power control, and thereby interference between cells is reduced. This embodiment applies this interference coordination to Embodiment 1.

Figure 14:
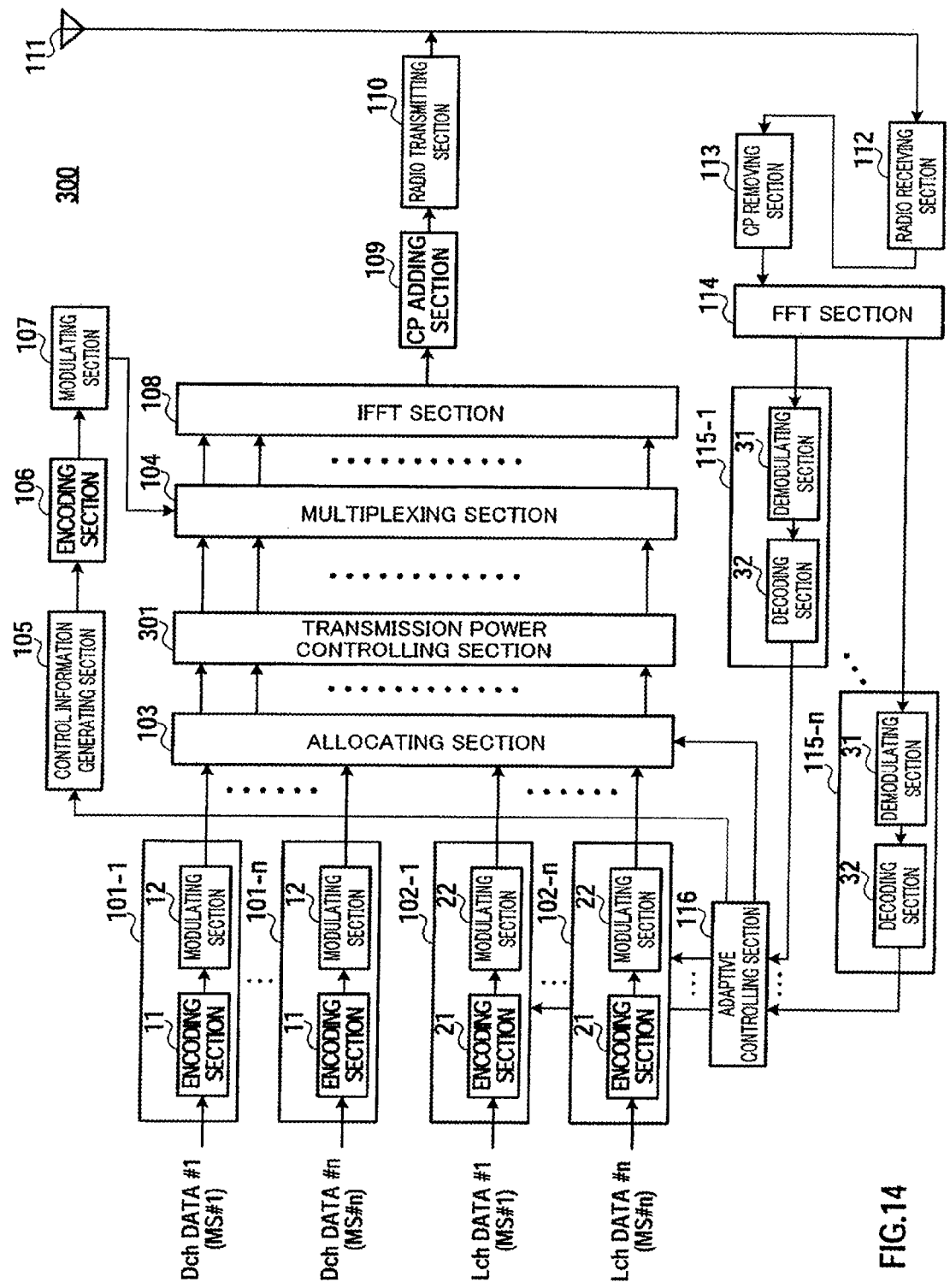
FIG. 14 is a block diagram showing a configuration of a base station according to Embodiment 3 of the present invention.

The configuration of base station 300 according to this embodiment is shown in FIG. 14. In FIG. 14, components that are the same as those in Embodiment 1 (FIG. 1) will be assigned the same reference numerals without further explanations.

Figure 15:
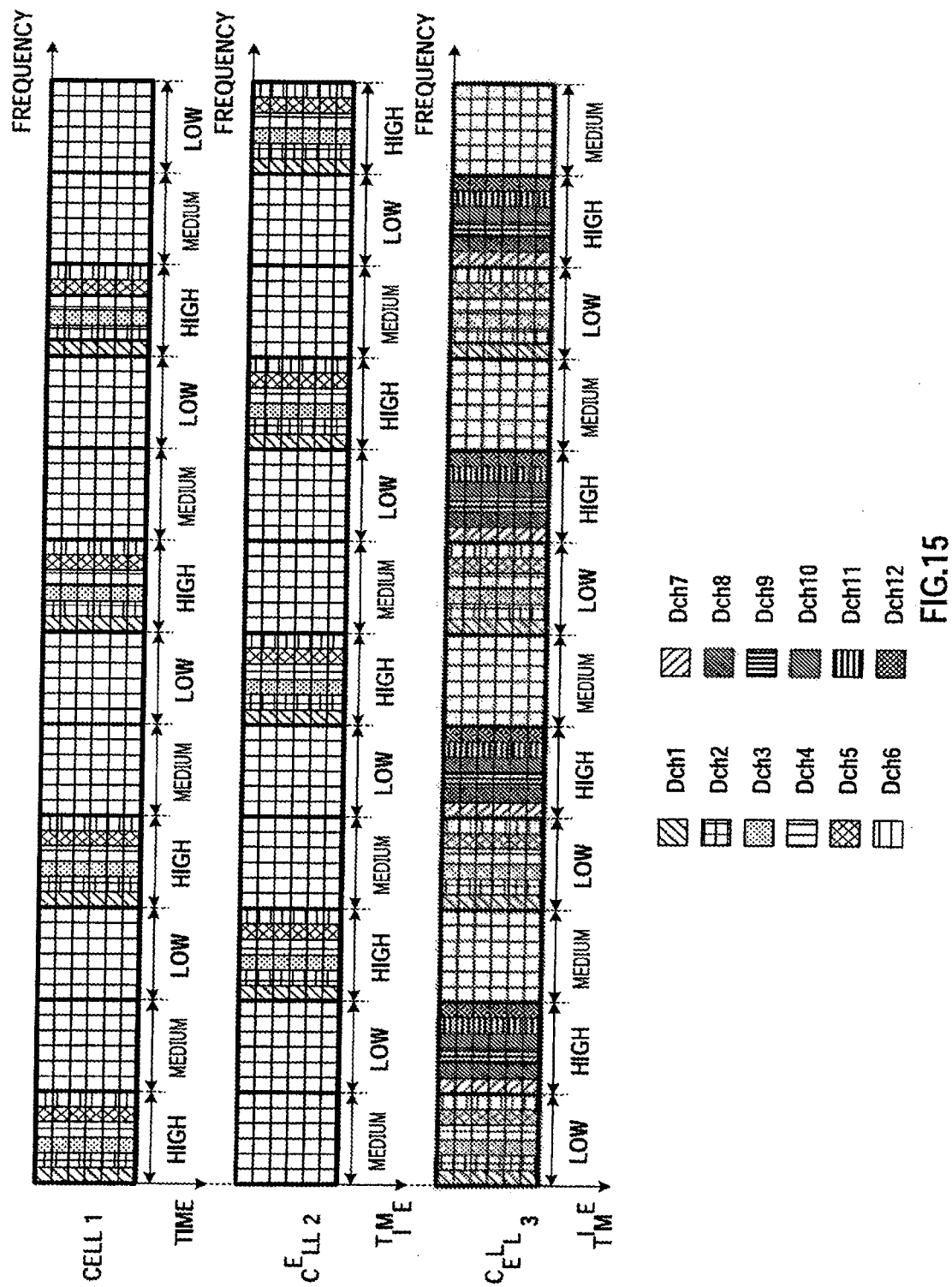
FIG. 15 shows an example of transmission power control according to Embodiment 3 of the present invention.

In base station 300, transmission power controlling section 301 performs transmission power control on Dch data symbols and Lch data symbols per subband. To be more specific, base stations 300 of the cells which are adjacent to each other, perform transmission power control as shown in FIG. 15. That is, base station 300 of cell 1 sets transmission power high, medium, low, high, medium, low, . . . , in that order, from subband 1, in subbands 1 to 12. Base station 300 of cell 2 sets transmission power medium, low, high, medium, low, high, . . . , in that order, from subband 1, in subbands 1 to 12. Further, base station 300 of cell 3 sets transmission power as low, high, medium, low, high, medium, . . . , in that order, from subband 1, in subbands 1 to 12. The "high," "medium," and "low" transmission power is as follows: for example, when transmission power "medium" is set as a reference (0 dB), "high" transmission power refers to transmission power 5 dB higher than the reference, and "low" transmission power refers to transmission power 5 dB lower than the reference. In this way, by making transmission power in the same subband different between cells, it is possible to realize interference coordination and reduce interference between cells.

Further, conventionally, interference coordination needs to be performed between Dchs or Lchs, and so it is necessary to make the number of Dchs and the number of Lchs the same between cells. By contrast with this, as described in Embodiment 1, when Dch subbands and Lch subbands are set, even if the number of Dchs and the number of Lchs are set freely in each cell, it is possible to realize interference coordination as shown in FIG. 15.

Further, conventionally, interference coordination needs to be performed between Dchs, and so the transmission power of Dchs cannot be set "high" in all cells that are adjacent to each other. By contrast with this, if Dch subbands are set as described in Embodiment 1, it is possible to set the transmission power of Dchs "high" in all adjacent cells as shown in FIG. 15.

Embodiments of the present invention have been described.

Although a case has been described with the above-described embodiments where a signal received at the base station (that is, a signal transmitted by the mobile station in uplink) is transmitted based on the OFDM scheme, this signal may be transmitted based on other transmission schemes other than the OFDM scheme, such as a single carrier scheme and the CDMA scheme.

Further, a case has been described with the above-described embodiments where adaptive modulation is performed on only Lchs, adaptive modulation may be also performed on Dchs in the same way.

Still further, an Lch may be referred to as a "frequency scheduling channel," and a Dch may be referred to as a "frequency diversity channel."

Furthermore, a mobile station, a base station apparatus and a subcarrier may be referred to as "UE," "Node B" and "tone," respectively. Further, a subband may be referred to as a "subchannel," "subcarrier block," "resource block" or "chunk." Still further, a CP may be referred to as a "guard interval (GI)."

Each function block used to explain the above-described embodiments may be typically implemented as an LSI constituted by an integrated circuit. These may be individual chips or may be partially or totally contained on a single chip. Here, each function block is described as an LSI, but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor in which connections and settings of circuit cells within an LSI can be reconfigured is also possible.

Further, if integrated circuit technology comes out to replace LSI's as a result of the development of semiconductor technology or a derivative other technology, it is naturally also possible to carry out function block integration using this technology. Application of biotechnology is also possible.

The present application is based on Japanese Patent Application No. 2005-321110, filed on Nov. 4, 2005, the entire content of which is expressly incorporated by reference herein.

INDUSTRIAL APPLICABILITY

The present invention can be applied to a mobile communication system and the like.

The invention claimed is:

1. An integrated circuit comprising:
    mapping circuitry, which, in operation, maps either a first block, to which data indicated by a single resource index are localizedly allocated, or each of a plurality of second blocks, to which data indicated by the single resource index are distributedly allocated, to each of a plurality of blocks, into which a plurality of consecutive subcarriers in a frequency domain and a subframe are divided and each of which is comprised of the same number of subcarriers; and
    transmitting circuitry, which, in operation, controls transmission of the data,
    wherein the plurality of second blocks, to which the data indicated by the single resource index are allocated, are mapped to the plurality of blocks with a predetermined gap such that the data indicated by the single resource index are distributed in the frequency domain, and a resource size for the data indicated by the single resource index in the plurality of second blocks is constant regardless of variation of the predetermined gap, and
    wherein a plurality of data sets indicated by different resource indices are multiplexed in the plurality of second blocks, and a number of the plurality of second blocks used to transmit one of the data sets indicated by the single resource index in the subframe is the same as a number of the plurality of data sets multiplexed in one of the plurality of second blocks.

2. The integrated circuit according to claim 1, comprising:
    at least one input coupled to the mapping circuitry, wherein the at least one input, in operation, inputs data; and
    at least one output coupled to the transmitting circuitry, wherein the at least one output, in operation, outputs data.

3. The integrated circuit according to claim 2, wherein a plurality of data sets for a plurality of different receiving apparatuses are time-multiplexed in the plurality of second blocks.

4. The integrated circuit according to claim 2, wherein in the plurality of second blocks, the data indicated by the single resource index are allocated in different positions in a time domain.

5. The integrated circuit according to claim 2, wherein the first block is used in a frequency scheduling transmission.

6. The integrated circuit according to claim 2, wherein the plurality of second blocks is used in a frequency diversity transmission.

7. The integrated circuit according to claim 2, wherein the resource size is defined by a number of subcarriers used to transmit the data indicated by the single resource index in a subframe.

8. The integrated circuit according to claim 2, wherein the resource size is defined by a number of units used to transmit the data indicated by the single resource index in a subframe, wherein each unit is defined as "one subcarrier x one symbol."

9. The integrated circuit according to claim 2, wherein a resource size for the data indicated by the single resource index in the first block is the same as a resource size for the data indicated by the single resource index in the plurality of second blocks in a subframe.

10. The integrated circuit according to claim 2, wherein the at least one output and the at least one input, in operation, are coupled to an antenna.

11. An integrated circuit comprising:
    at least one input; and
    circuitry coupled to the at least one input, wherein the circuitry, in operation:
    controls mapping of either a first block, to which data indicated by a single resource index are localizedly allocated, or each of a plurality of second blocks, to which data indicated by the single resource index are distributedly allocated, to each of a plurality of blocks, into which a plurality of consecutive subcarriers in a frequency domain and a subframe are divided and each of which is comprised of the same number of subcarriers; and
    controls transmission of the data, wherein the plurality of second blocks, to which the data indicated by the single resource index are allocated, are mapped to the plurality of blocks with a predetermined gap such that the data indicated by the single resource index are distributed in the frequency domain, and a resource size for the data indicated by the single resource index in the plurality of second blocks is constant regardless of variation of the predetermined gap, and wherein a plurality of data sets indicated by different resource indices are multiplexed in the plurality of second blocks, and a number of the plurality of second blocks used to transmit one of the data sets indicated by the single resource index in the subframe is the same as a number of the plurality of data sets multiplexed in one of the plurality of second blocks.

12. The integrated circuit according to claim 11, comprising:

at least one output coupled to the circuity, wherein the at least one output, in operation, outputs data.

13. The integrated circuit according to claim 12, wherein a plurality of data sets for a plurality of different receiving apparatuses are time-multiplexed in the plurality of second blocks.

14. The integrated circuit according to claim 12, wherein in the plurality of second blocks, the data indicated by the single resource index are allocated in different positions in a time domain.

15. The integrated circuit according to claim 12, wherein the first block is used in a frequency scheduling transmission.

16. The integrated circuit according to claim 12, wherein the plurality of second blocks is used in a frequency diversity transmission.

17. The integrated circuit according to claim 12, wherein the resource size is defined by a number of subcarriers used to transmit the data indicated by the single resource index in a subframe.

18. The integrated circuit according to claim 12, wherein the resource size is defined by a number of units used to transmit the data indicated by the single resource index in a subframe, wherein each unit is defined as "one subcarrier x one symbol."

19. The integrated circuit according to claim 12, wherein a resource size for the data indicated by the single resource index in the first block is the same as a resource size for the data indicated by the single resource index in the plurality of second blocks in a subframe.

20. The integrated circuit according to claim 12, wherein the at least one output and the at least one input, in operation, are coupled to an antenna.

* * * * *